United States Patent
Eck

(10) Patent No.: US 6,488,476 B2
(45) Date of Patent: Dec. 3, 2002

(54) FUEL FEED UNIT

(75) Inventor: Karl Eck, Frankfurt (DE)

(73) Assignee: Mannesmann VDO AG, Frankfurt am Main (DE)

(*) Notice: Subject to any disclaimer, the term of this patent is extended or adjusted under 35 U.S.C. 154(b) by 0 days.

(21) Appl. No.: 09/840,610

(22) Filed: Apr. 23, 2001

(65) Prior Publication Data

US 2001/0055530 A1 Dec. 27, 2001

(30) Foreign Application Priority Data

Jun. 3, 2000 (DE) .......................... 100 27 650

(51) Int. Cl.⁷ .......................... F04B 23/04; F04B 23/08; B01D 47/02
(52) U.S. Cl. .................. 417/76; 417/88; 137/565.22
(58) Field of Search .............. 417/88, 76; 137/565.22, 137/565.34, 574; 123/514

(56) References Cited

U.S. PATENT DOCUMENTS

| | | | | |
|---|---|---|---|---|
| 4,420,396 A | * | 12/1983 | Yamamoto et al. | 210/172 |
| 4,860,714 A | * | 8/1989 | Bucci | 123/509 |
| 5,070,849 A | * | 12/1991 | Rich et al. | 123/509 |
| 5,080,077 A | * | 1/1992 | Sawert et al. | 123/509 |
| 5,139,000 A | * | 8/1992 | Sawert | 123/514 |
| 5,218,942 A | * | 6/1993 | Coha et al. | 123/509 |
| 5,699,773 A | * | 12/1997 | Kleppner et al. | 123/509 |
| 5,960,775 A | * | 10/1999 | Tuckey | 123/509 |

* cited by examiner

Primary Examiner—Charles G. Freay
Assistant Examiner—Timothy P. Solak
(74) Attorney, Agent, or Firm—Richard A. Speer; Mayer, Brown, Rowe & Maw

(57) ABSTRACT

In a fuel feed unit (3) for a motor vehicle, a suction jet pump (6) provided for filling a baffle (2) of a fuel tank (1) is manufactured in one piece with a holding part (4) for a fuel pump (5). The holding part (4) is of pot-shaped design for receiving the fuel pump (5) and carries a fuel filter (7) on a vertical wall (8). Fuel thereby passes to the suction jet pump (6) immediately after the fuel pump (5) has been started up.

7 Claims, 1 Drawing Sheet

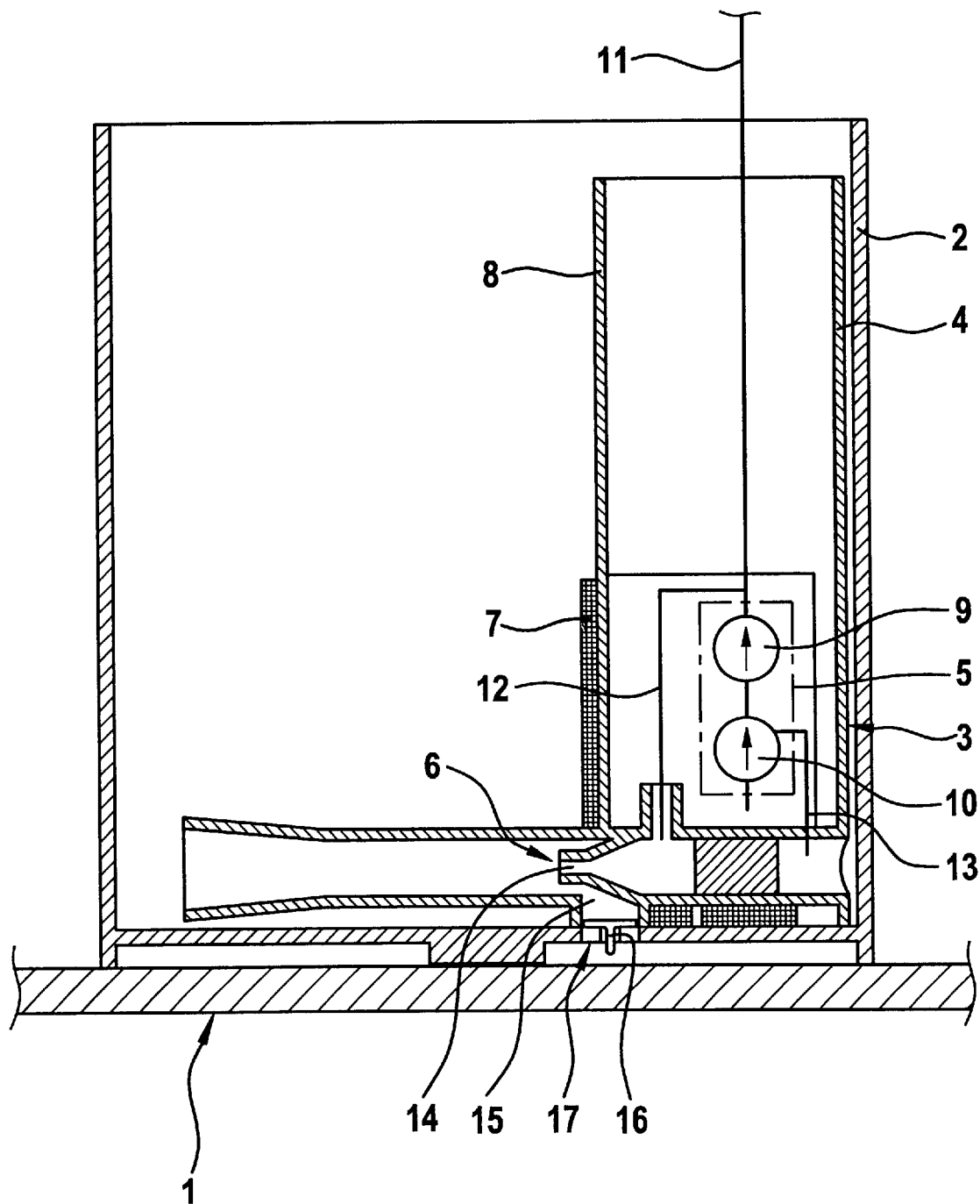

FUEL FEED UNIT

BACKGROUND OF THE INVENTION

The invention relates to a fuel feed unit for a motor vehicle, with at least one fuel pump fastened to a holding part and intended for sucking in fuel from a baffle arranged in the bottom region of a fuel tank, and with a suction jet pump provided for feeding fuel out of the fuel tank into the baffle and connected to the fuel pump via a supply line.

Such fuel feed units are often used in present-day motor vehicles and are therefore known. The fuel filter, is, as a rule, shaped in the form of a bag and is fastened to an intake connection piece of the fuel pump. The fuel pump is pre-stressed, together with the fuel filter, against the bottom region of the baffle by the holder. A forward-flowline leading from the feed unit to an internal combustion engine of the motor vehicle has a branch for the supply line leading to the suction jet pump. The suction jet pump is usually fastened in the wall of the baffle and serves for ensuring a minimum filling level of fuel in the baffle when the fuel tank is almost empty.

The known fuel feed unit has the disadvantage that it is complicated to mount and the supply line has to be very long for mounting in the fuel tank. However, the result of the supply line having a long length is that, after the fuel pump has been started up, the suction jet pump feeds fuel into the baffle only after a delay. Consequently, when the fuel tank is virtually empty, the fuel pump is often for a short time not supplied with fuel. This may lead to damage to the internal combustion engine or to an exhaust gas catalytic converter.

The problem on which the invention is based is to design a fuel feed unit of the type initially mentioned, in such a way that it is particularly simple to mount and fuel is fed particularly quickly into the baffle after the fuel pump has been started.

BRIEF DESCRIPTION OF THE INVENTION

This problem is solved, according to the invention, in that the holding part and the suction jet pump form a pre-mountable structural unit.

By virtue of its design, the suction jet pump can be connected to the fuel pump before being mounted in the fuel tank. On account of the invention, it is no longer necessary for the supply line for the suction jet pump to be laid in the fuel tank. The mounting of the feed unit according to the invention, thereby becomes very simple. Another advantage of this design is that the functioning of the fully mounted fuel feed unit can be checked outside the fuel tank. Moreover, the supply line for the suction jet pump can be made very short.

This leads to particularly low flow losses in the supply line and therefore to a particularly low power consumption of the suction jet pump. Since the supply line is of short length, it has a small volume, thus contributing to a particularly short delay in the feed through the suction jet pump after the fuel pump has been started up. Fuel is therefore fed into the baffle virtually immediately after the fuel pump is started up.

According to another advantageous development of the invention, the delay in the operation of the suction jet pump after the fuel pump is started up can be kept particularly small if the supply line of the suction jet pump is led vertically from the delivery side of the fuel pump to the suction jet pump. Furthermore, as a result of this configuration, no gas bubbles can accumulate in the supply line and consequently impair the operation of the suction jet pump.

According to an advantageous development of the invention, the suction jet pump requires a particularly low volume flow of fuel for it to operate if, in the case of a fuel pump with a high-pressure stage and a low-pressure stage, the supply line of the suction jet pump is connected directly downstream of the high-pressure stage, as seen in the direction of flow.

A contribution to further simplifying the mounting of the fuel feed unit according to the invention is made if the holding part is manufactured in one piece with the supply line.

The fuel feed unit according to the invention has a particularly simple design if the holding part for receiving the fuel pump is of pot-shaped design. Moreover, this configuration leads to a particularly simple mounting of the fuel feed unit according to the invention.

The fuel filter, could, for example, be designed in the form of a bag, as in the known fuel feed unit. However, according to another advantageous development of the invention, contamination of the fuel filter is kept particularly low if the fuel filter is arranged in a vertical region of the wall of the holding part. As a result, dirt particles can fall down from the fuel filter after the fuel pump has been switched off.

The fuel feed unit according to the invention is particularly compact if the suction jet pump is arranged directly below the fuel pump. Furthermore, gas bubbles can thereby escape from the supply line very simply.

According to another advantageous development of the invention, the mounting of the holding part, together with the suction jet pump, in the fuel tank becomes particularly simple if the holding part has, in its bottom region, an orifice designed for sucking in the fuel and provided in front of a passage in the baffle for mounting purposes.

The holding part could have, for example, a flange for the connection of the suction jet pump. However, according to another advantageous development of the invention, the holding part can be manufactured, together with the suction jet pump, from plastic in a common injection mold in a particularly cost-effective way if the suction jet pump is manufactured in one piece with the holding part. Mounting of the suction jet pump on the holding part is thereby avoided.

A contribution to further simplifying the mounting of the fuel feed unit according to the invention is made if the holding part has a degassing line for the fuel pump.

DESCRIPTION OF THE DRAWING

The single FIGURE of the drawings is a cross-sectional view through a fuel feed unit of the present invention.

DETAILED DESCRIPTION OF THE INVENTION

The invention permits numerous embodiments. In order to make its basic principle even clearer, one of these is illustrated in the drawing and is described below. This shows, in a single FIGURE, a sectional illustration through a bottom region of a fuel tank 1 for a motor vehicle, with a baffle 2 and with a fuel feed unit 3 according to the invention.

The fuel feed unit 3 has a holding part 4 arranged in the baffle 2. The holding part 4 forms a structural unit with a fuel pump 5, a suction jet pump 6 and a fuel filter 7. The holding part 4 is for this purpose, of pot-shaped design and is manufactured in one piece with the suction jet pump 6. The fuel filter 7 is arranged in a vertical region of a wall 8 of the holding part 4. The fuel pump 5 has a high-pressure stage 9 and a low-pressure stage 10. The low-pressure stage 10 sucks in fuel, purified by the fuel filter 7, from the bottom region of the holding part 4 and feeds it to the high-pressure stage 9. Connected to the high-pressure stage 9 are a forward-flowline 11 leading to an internal combustion engine, not illustrated, of the motor vehicle and a supply line 12 leading to the suction jet pump 6. The low-pressure stage 10 has a degassing line 13 led out of the holding part 4. To make the drawing clearer, the fuel pump 5 and the lines 11–13 are illustrated diagrammatically.

The supply line 12 leads directly from the high-pressure stage 9 of the fuel pump 5 vertically downward to a nozzle 14 of the suction jet pump 6. The holding part 4 has a orifice 15 directly below the nozzle 14. The orifice 15 is located above a passage 17 of the baffle 2, said passage being capable of being closed by a valve 16. When the fuel pump 5 is started up, fuel passes to the nozzle 14 of the suction jet pump 6 without any appreciable delay. Fuel is thereby sucked in from the fuel tank 1 and fed into the baffle 2. After the fuel pump 5 is switched off, the valve 16 closes the passage 17 in the baffle 2 and thus prevents the baffle 2 from running empty.

What is claimed is:

1. A fuel feed unit for use in a motor vehicle having a fuel tank and a baffle defining a fuel reservoir located in and positioned adjacent the bottom of the fuel tank, the baffle holding a first quantity of fuel separate from the fuel in the tank, the feed unit comprising:
    (a) a unitary fuel holding and jet pumping structure mounted within the fuel reservoir baffle, the holding and pumping structure including,
        (i) an open-top extended wall portion that defines an open volume for holding a second quantity of fuel separately from the first quantity of fuel held in the fuel tank baffle and, (ii) jet pump structure integrally connected to the extended wall portion and open to the fuel within the fuel tank baffle;
    (b) a fuel supply pump mounted above the jet pump within the volume defined by the extended wall portion and connected to supply fuel to the motor vehicle engine and to the jet pump to draw fuel into volume defined by the fuel tank baffle;
    (c) a fuel supply flow line between the fuel supply pump and the motor vehicle engine; and
    (d) a fuel supply flow line running directly between the fuel supply pump and the jet pump to effect operation of the jet pump.

2. The fuel feed unit as claimed in claim 1, wherein a supply line of the suction jet pump is led downwardly from the delivery side of the fuel pump to the suction jet pump.

3. The fuel feed unit as defined in claim 2 wherein the supply line is formed integrally with the wall portion and jet pump structure.

4. The fuel feed unit as claimed in claim 1 or 2, wherein, the fuel pump has a high-pressure stage and a low-pressure stage, and the supply line from the fuel supply pump to the suction jet pump is connected solely to the jet pump downstream of the high-pressure stage of the fuel pump.

5. The fuel feed unit as defined in claim 1 wherein the open-top extended wall portion has a fuel filter mounted therein.

6. The fuel feed unit as defined in claim 1 wherein the suction jet pump is manufactured in one piece with the holding part.

7. The fuel feed unit as defined in claim 1 wherein the unitary fuel holding structure has a degassing line for the fuel pump.

* * * * *